United States Patent
Yaguchi

(10) Patent No.: US 9,493,162 B2
(45) Date of Patent: Nov. 15, 2016

(54) VEHICLE CONTROL DEVICE

(71) Applicant: Hideaki Yaguchi, Toyota (JP)

(72) Inventor: Hideaki Yaguchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/765,435

(22) PCT Filed: Feb. 5, 2013

(86) PCT No.: PCT/JP2013/052592
§ 371 (c)(1),
(2) Date: Aug. 3, 2015

(87) PCT Pub. No.: WO2014/122724
PCT Pub. Date: Aug. 14, 2014

(65) Prior Publication Data
US 2015/0375745 A1    Dec. 31, 2015

(51) Int. Cl.
*B60W 30/18* (2012.01)
*B60W 50/10* (2012.01)
(Continued)

(52) U.S. Cl.
CPC .............. *B60W 30/18* (2013.01); *B60W 20/00* (2013.01); *B60W 50/10* (2013.01); *B60W 50/12* (2013.01);
(Continued)

(58) Field of Classification Search
CPC .... B60W 30/18; B60W 50/10; B60W 20/00; B60W 50/12; B60W 2520/10; B60W 2540/12; B60W 2720/106; B60W 2540/10; Y02T 10/6239; B60K 6/445

USPC .......................................................... 701/70
See application file for complete search history.

(56) References Cited

U.S. PATENT DOCUMENTS

2002/0019694 A1* 2/2002 Sielagoski ......... B60K 31/0008
701/96
2004/0127333 A1* 7/2004 McCall ................. B60K 28/00
477/206
(Continued)

FOREIGN PATENT DOCUMENTS

JP    2001-018690 A    1/2001
JP    2010-38051 A    2/2010
(Continued)

OTHER PUBLICATIONS

International Preliminary Report on Patentability issued Aug. 5, 2015 in PCT/JP2013/052592 (submitting English translation only, filed Feb. 5, 2013).
(Continued)

*Primary Examiner* — Anne M Antonucci
(74) *Attorney, Agent, or Firm* — Oblon, McClelland, Maier & Neustadt, L.L.P.

(57) ABSTRACT

When an accelerator pedal and a brake pedal are being simultaneously operated, an electronic control unit executes a driving power limiting process, in which the driving power is set less than that when only the accelerator pedal is operated. The electronic control unit executes the driving power limiting process after a predetermined time has elapsed from when simultaneous operation of the accelerator pedal and the brake pedal is performed. If the accelerator pedal and the brake pedal are simultaneously operated, the electronic control unit sets a target deceleration of the vehicle based on the vehicle speed before the start of the driving power limiting process and the operation amount of the brake pedal and then controls the driving power during execution of the driving power limiting process such that the deceleration of the vehicle matches the target deceleration.

6 Claims, 9 Drawing Sheets

(51) Int. Cl.
*B60W 50/12* (2012.01)
*B60W 20/00* (2016.01)
*B60K 6/445* (2007.10)

(52) U.S. Cl.
CPC ........... *B60K 6/445* (2013.01); *B60W 2520/10* (2013.01); *B60W 2540/10* (2013.01); *B60W 2540/12* (2013.01); *B60W 2720/106* (2013.01); *Y02T 10/6239* (2013.01)

(56) References Cited

U.S. PATENT DOCUMENTS

| | | | |
|---|---|---|---|
| 2010/0036566 A1 | 2/2010 | Hayami | |
| 2011/0295468 A1* | 12/2011 | Crombez | B60T 7/042 701/48 |
| 2014/0095045 A1 | 4/2014 | Takagi et al. | |

FOREIGN PATENT DOCUMENTS

| | | |
|---|---|---|
| JP | 2010/132064 A | 6/2010 |
| JP | 2011-163303 A | 8/2011 |
| JP | 2012-172670 A | 9/2012 |
| JP | WO 2012/172673 A1 | 12/2012 |
| WO | WO2012/056540 A1 | 5/2012 |

OTHER PUBLICATIONS

International Search Report issued Mar. 5, 2013, in PCT/JP2013/052592, filed Feb. 5, 2013.

Office Action issued Jun. 21, 2016 in Japanese Patent Application No. 2014-560549.

* cited by examiner

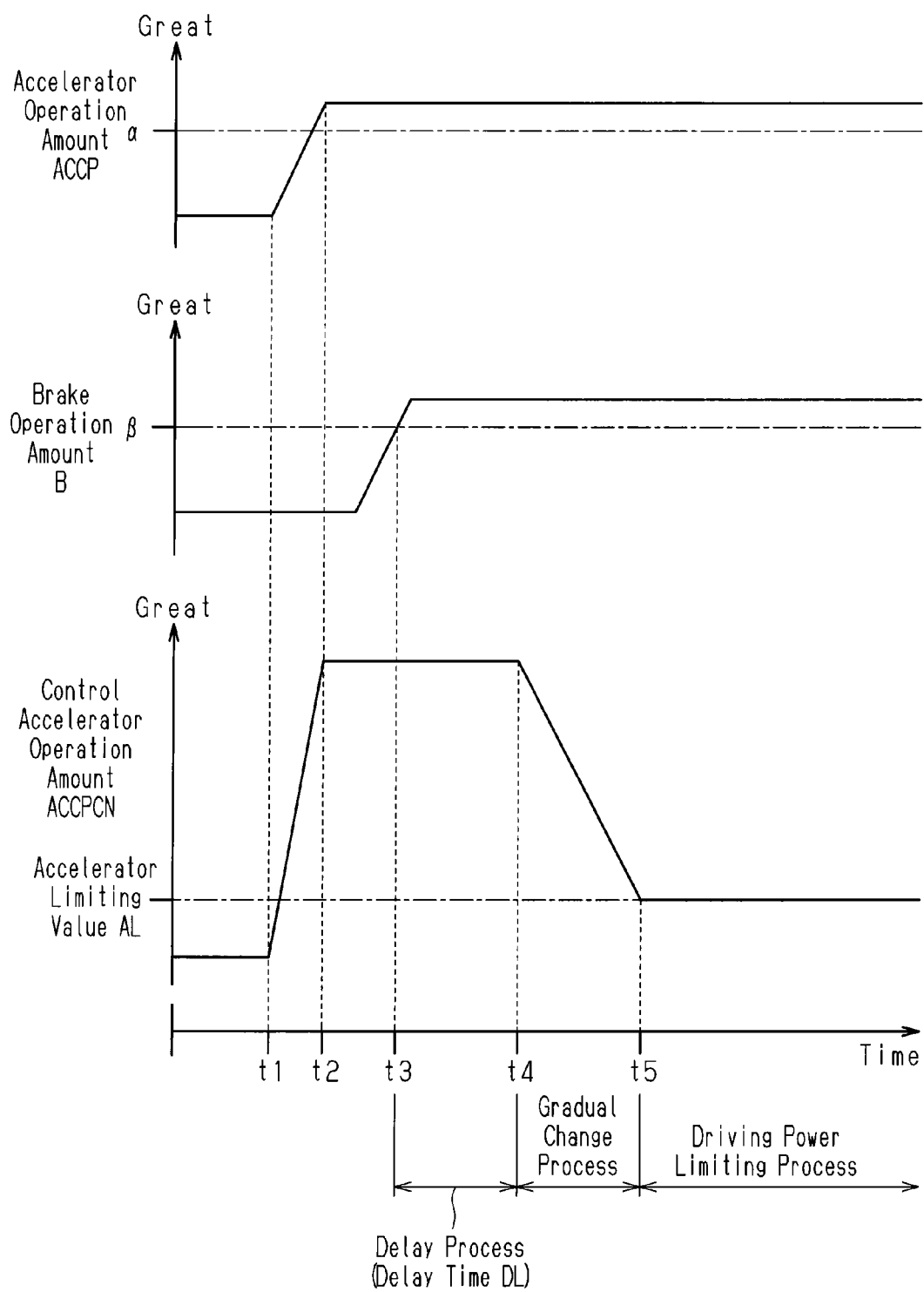

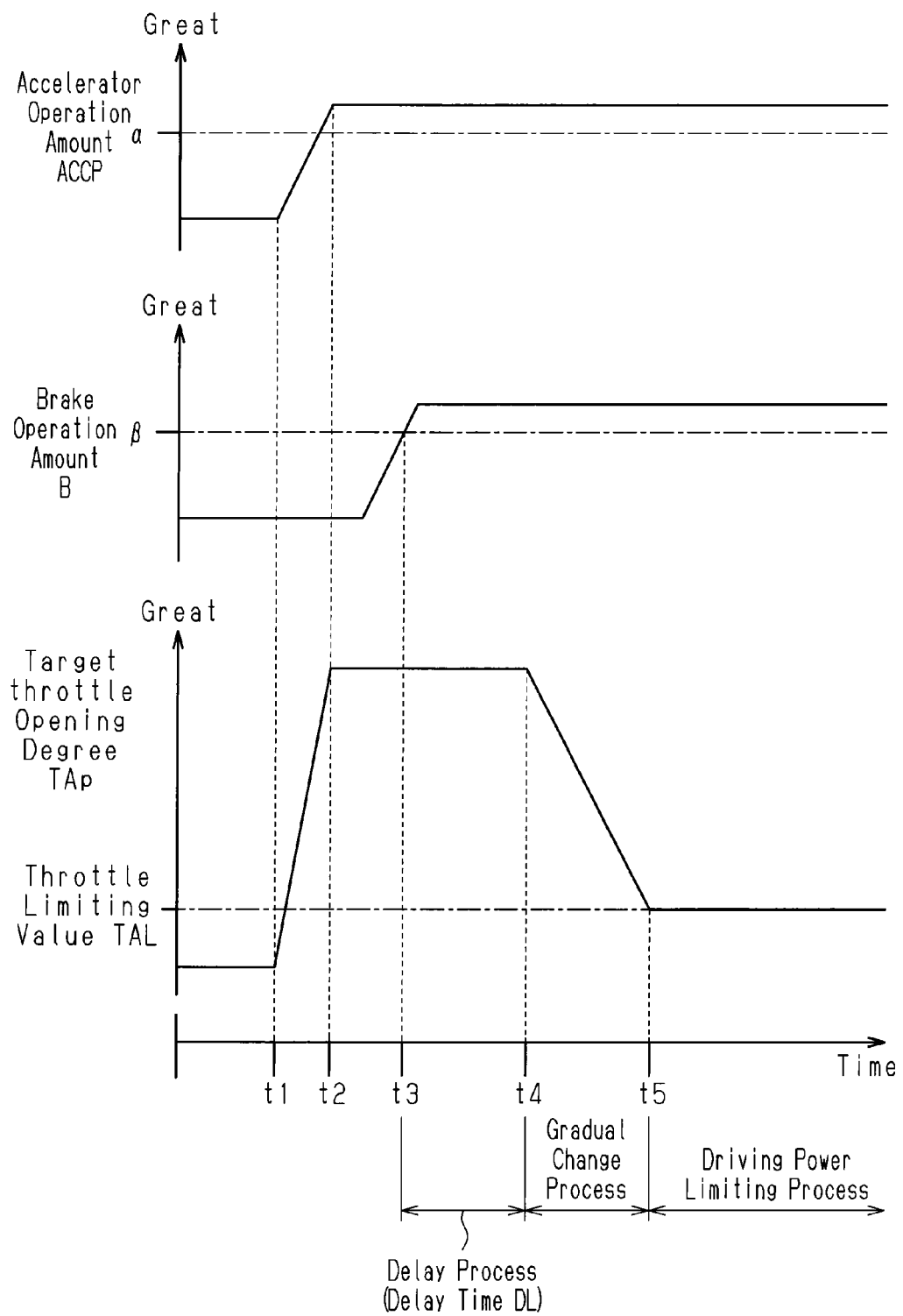

VEHICLE CONTROL DEVICE

TECHNICAL FIELD

The present invention relates to a device that controls driving power of a vehicle.

BACKGROUND ART

For example, Patent Document 1 discloses a control device that executes a driving power limiting process as one process for controlling the driving power. In the driving power limiting process, the control device reduces the driving power output by a drive source when an accelerator operating member and a brake operating member are being operated together in comparison to when only the accelerator operating member is operated.

PRIOR ART DOCUMENTS

Patent Documents

Patent Document 1: Japanese Laid-Open Patent Publication No. 2010-38051

SUMMARY OF THE INVENTION

Problems that the Invention is to Solve

The execution of the driving power limiting process immediately after simultaneous operation of the accelerator operating member and the brake operating member is performed may adversely affect drivability.

For example, if simultaneous operation of the accelerator operating member and the brake operating member is accidental and not intended by the vehicle driver, immediate execution of the driving power limiting process will result in deceleration of the vehicle despite the absence of the driver's intention for deceleration, causing drivability to deteriorate. Thus, a determination process is executed in which it is determined whether simultaneous operation of the accelerator operating member and the brake operating member has continued for a certain length of time. That is, if it is determined in the determination process that simultaneous operation of the accelerator operating member and the brake operating member has continued for a certain length of time, the driving power limiting process is executed. This limits an unintentional drop of the driving power when the simultaneous operation of the accelerator operating member and the brake operating member is accidental. As a result, drivability is restrained from deteriorating.

Also, if the driving power limiting process is executed to significantly reduce the driving power immediately after simultaneous operation of the accelerator operating member and the brake operating member is performed, the vehicle deceleration is rapidly increased. This also adversely affects drivability. In this regard, if a gradual change process for gradually reducing the driving power is executed in a period from simultaneous operation of the accelerator operating member and the brake operating member to the start of the driving power limiting process, the driving power is prevented from being rapidly dropped. Therefore, drivability is not adversely affected by a rapid increase in the vehicle deceleration.

The execution of the above described determination process and the gradual change process means that the driving power limiting process is executed after a certain length of time has elapsed after simultaneous operation of the accelerator operating member and the brake operating member. This limits deterioration of drivability at the execution of the driving power limiting process. However, if the determination process and the gradual change process are executed prior to the execution of the driving power limiting process, the time at which the driving power limiting process is executed is delayed compared to a case in which the driving power limiting process is executed immediately after simultaneous operation of the accelerator operating member and the brake operating member is performed. This extends the time required for the driving power to be sufficiently reduced at simultaneous operation of the accelerator operating member and the brake operating member. Thus, when the accelerator operating member and the brake operating member are simultaneously operated, the braking distance of the vehicle tends to be longer than when normal brake operation is performed, that is, when only the brake operating member is operated. Therefore, to stop the vehicle at a position predicted by the driver when the accelerator operating member and the brake operating member are simultaneously operated, the driver must increase the amount of operation of the brake operating member compared to the normal brake operation. This complicates the brake operation by the driver.

Accordingly, it is an objective of the present invention to simplify brake operation by the driver at the execution of the driving power limiting process when the accelerator operating member and the brake operating member are simultaneously operated.

Means for Solving the Problems

To achieve the foregoing objective and in accordance with one aspect of the present invention, a vehicle control device including a controller is provided. The controller executes a driving power limiting process, in which the controller reduces a driving power output by a drive source when an accelerator operating member and a brake operating member are being operated together in comparison to when only the accelerator operating member is operated. The controller is configured to execute the driving power limiting process when a predetermined time has elapsed after a point in time at which the accelerator operating member and the brake operating member are simultaneously operated. The controller is configured, when the accelerator operating member and the brake operating member are simultaneously operated, to set a target deceleration of the vehicle based on a vehicle speed and an operation amount of the brake operating member at a time before the driving power limiting process is started, and to control the driving power during execution of the driving power limiting process such that the vehicle deceleration becomes equal to the target deceleration.

In this configuration, during the execution of the driving power limiting process, the driving power is controlled such that the deceleration of the vehicle becomes equal to the target deceleration. When the target deceleration is set, the amount of operation of the brake operating member (brake operation amount) is taken into consideration. Thus, the driving power during the execution of the driving power limiting process can be controlled, factoring in the brake operation amount by the vehicle driver.

When the normal brake operation, in which only the brake operating member is operated, is performed, the lower the vehicle speed is, the shorter the braking distance becomes, in general. Hence, the lower the vehicle speed is, the smaller the brake operation amount by the driver becomes. Therefore, even when the driving power limiting process is executed, a lower vehicle speed possibly results in a smaller brake operation amount by the driver. To maintain drivability, the driving power limiting process is executed after the predetermined time has elapsed from when simultaneous operation of the accelerator operating member and the brake operating member is performed. In this case, the braking distance of the vehicle tends to be longer than that in the normal brake operation, in which only the brake operating member is operated. Particularly, in low vehicle speed regions, in which the brake operation amount is small, the braking distance tends to be longer. Thus, the lower the vehicle speed is before the start of the driving power limiting process, the more frequently the brake operation amount is increased and the greater the increase amount of the brake operation amount becomes to stop the vehicle at a position predicted by the driver.

In this regard, when setting the target deceleration, the above described configuration takes into consideration not only the brake operation amount, but also the vehicle speed. This allows the braking distance to be shortened by increasing the target deceleration for lower vehicle speeds. Thus, the vehicle can be stopped at the position predicted by the driver, while limiting the increase in the brake operation amount by the driver. Therefore, it is possible to simplify brake operation by the driver at the execution of the driving power limiting process when the accelerator operating member and the brake operating member are simultaneously operated.

It is preferable that, in the above described vehicle control device, that the lower the vehicle speed is, the greater the target deceleration is set to be. In this case, the more likely it is that the brake operation amount by the driver will become small, the greater the target deceleration is set to be. Thus, the more likely it is that the brake operation amount will become small, the greater the deceleration of the vehicle will be.

It is preferable that, in the above described vehicle control device, the greater the operation amount of the brake operating member is, the greater the target deceleration is set to be. In this case, the target deceleration is determined in accordance with the degree of the driver's demand for deceleration. This allows the actual deceleration of the vehicle to approach the degree of the driver's demand for deceleration.

It is preferable that, in the above described vehicle control device, the controller is configured to execute the driving power limiting process when simultaneous operation of the accelerator operating member and the brake operating member has been continuing.

In this configuration, the driving power limiting process is executed when simultaneous operation of the accelerator operating member and the brake operating member has been continuing. Such execution limits an unintentional drop of the driving power when simultaneous operation of the accelerator operating member and the brake operating member is accidental.

It is preferable that, in the above described vehicle control device, the controller is configured to execute a gradual change process for gradually reducing the driving power in a period from when the accelerator operating member and the brake operating member are simultaneously operated to when the driving power limiting process is started.

This configuration restrains the driving power from being rapidly dropping due to execution of the driving power limiting process. This limits a rapid increase of the vehicle deceleration that accompanies the execution of the driving power limiting process. Drivability therefore will not deteriorate due to a rapid increase in the vehicle deceleration.

BRIEF DESCRIPTION OF THE DRAWINGS

FIG. 8 is a timing diagram showing an overview of a brake override system according to a modification of the embodiment; and FIG. 9 is a timing diagram showing an overview of a brake override system according to a modification of the embodiment.

MODES FOR CARRYING OUT THE INVENTION

A vehicle control device according to one embodiment will now be described with reference to FIGS. 1 to 5. In the embodiment, the vehicle control device is mounted in a hybrid vehicle that has an engine and a motor as drive sources.

Figure 1:
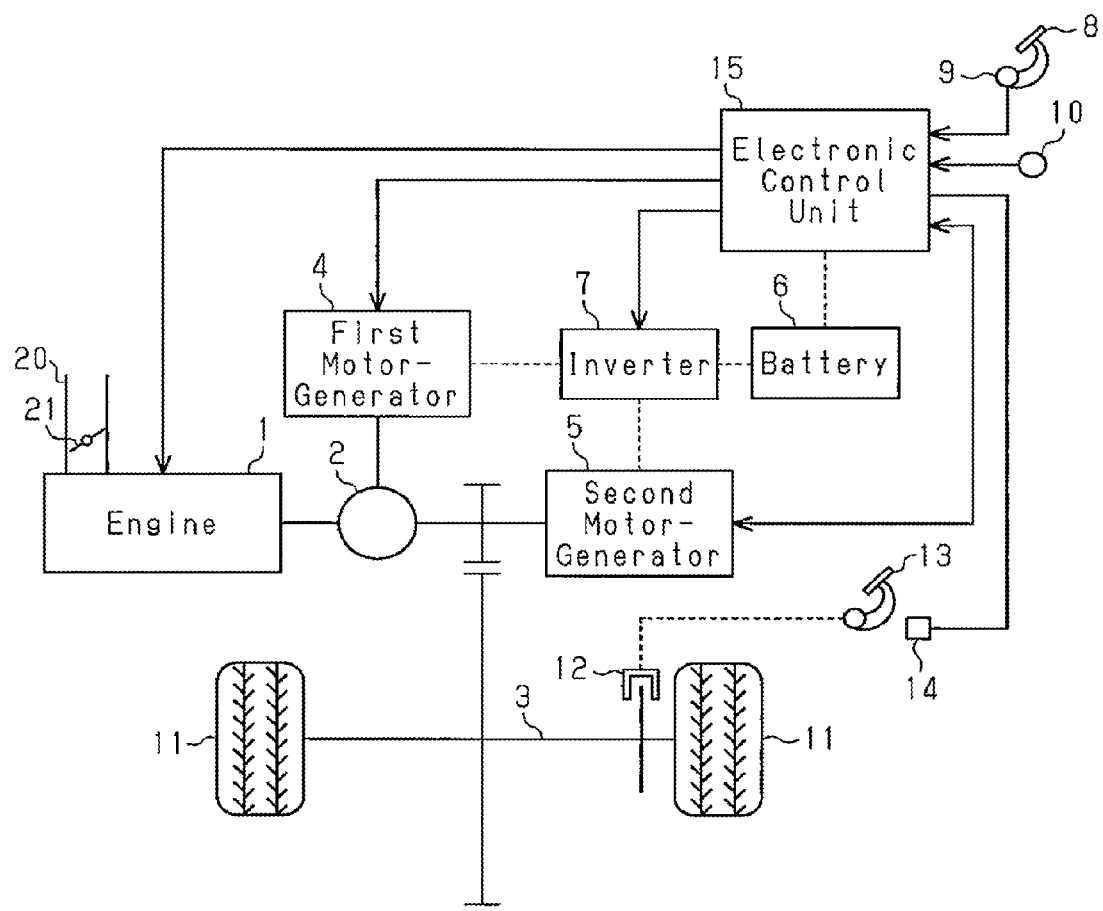
FIG. 1 is a schematic diagram showing the structure of a hybrid vehicle equipped with a vehicle control device according to one embodiment.

FIG. 1 shows a hybrid vehicle that includes an engine 1. The engine 1 has an intake passage 20 for introducing air into cylinders. The intake passage 20 includes a throttle valve 21 for regulating the intake air amount. The opening degree of the throttle valve 21 is adjusted to control the output of the engine 1.

The driving power output from the engine 1 is split by a power split device 2, which includes planetary gears, into driving power transmitted to a drive shaft 3 of the vehicle and driving power transmitted to a first motor-generator 4. The drive shaft 3 of the vehicle also receives driving power output by a second motor-generator 5. The driving power transmitted to the drive shaft 3 rotates wheels 11 coupled to the drive shaft 3, which causes the vehicle to travel. The vehicle also includes a brake device 12, which applies brakes on the rotation of the wheels 11, thereby decelerating the vehicle.

The first motor-generator 4, which functions mainly as a generator, also functions as a motor depending on the driving state of the vehicle. The second motor-generator 5, which functions mainly as a motor, also functions as a generator depending on the driving state of the vehicle. The vehicle includes an inverter 7 that controls transmission of electricity between the first and second motor-generators 4, 5 and a battery 6. The inverter 7, for example, supplies electricity generated by the first motor-generator 4, which mainly functions as a generator, to the battery 6, thereby charging the battery 6. The inverter 7 also supplies electricity from the battery 6 to the second motor-generator 5, which mainly functions as a motor.

The vehicle has an electronic control unit 15, which serves as a controller. The electronic control unit 15 includes a CPU, which executes computation processes for controlling the above-mentioned devices, a ROM that stores programs and data required for the control, a RAM that temporarily stores, for example, computation results of the CPU, and input/output ports for receiving and outputting signals from and to the outside.

The electronic control unit 15 receives through the input port signals from various sensors shown below, for example.

An accelerator position sensor 9 detects the amount of operation of the accelerator pedal (an accelerator operating member) operated by the driver of the vehicle, or an accelerator operation amount ACCP.

A vehicle speed sensor 10 detects the speed of the vehicle (vehicle speed SP).

A brake sensor 14 detects the amount of operation of the brake pedal (a brake operating member) operated by the driver of the vehicle, or a brake operation amount B. The greater the brake operation amount B is, the greater the braking force of the brake device 12 becomes.

The electronic control unit 15 is connected through the output port to the drive circuits of various devices for operating the engine 1, the drive circuit of the first motor-generator 4, the drive circuit of the second motor-generator 5, and the driver circuit of the inverter 7.

The electronic control unit 15 computes a target driving power P of the vehicle based on the engine operating state such as the vehicle speed SP and the accelerator operation amount ACCP. The electronic control unit 15 controls the driving power output by the engine 1 and the driving power output by the second motor-generator 5 to gain the computed target driving power P. Such control of the engine 1 and the second motor-generator 5 is executed while taking into consideration minimization of the energy consumption.

The electronic control unit 15 includes a brake override system, which is one of the control procedures for controlling the driving power of the vehicle. The brake override system executes a driving power limiting process for reducing the driving power output by the drive sources when the accelerator pedal 8 and the brake pedal 13 are operated simultaneously compared to when only the accelerator pedal 8 is operated.

Figure 2:
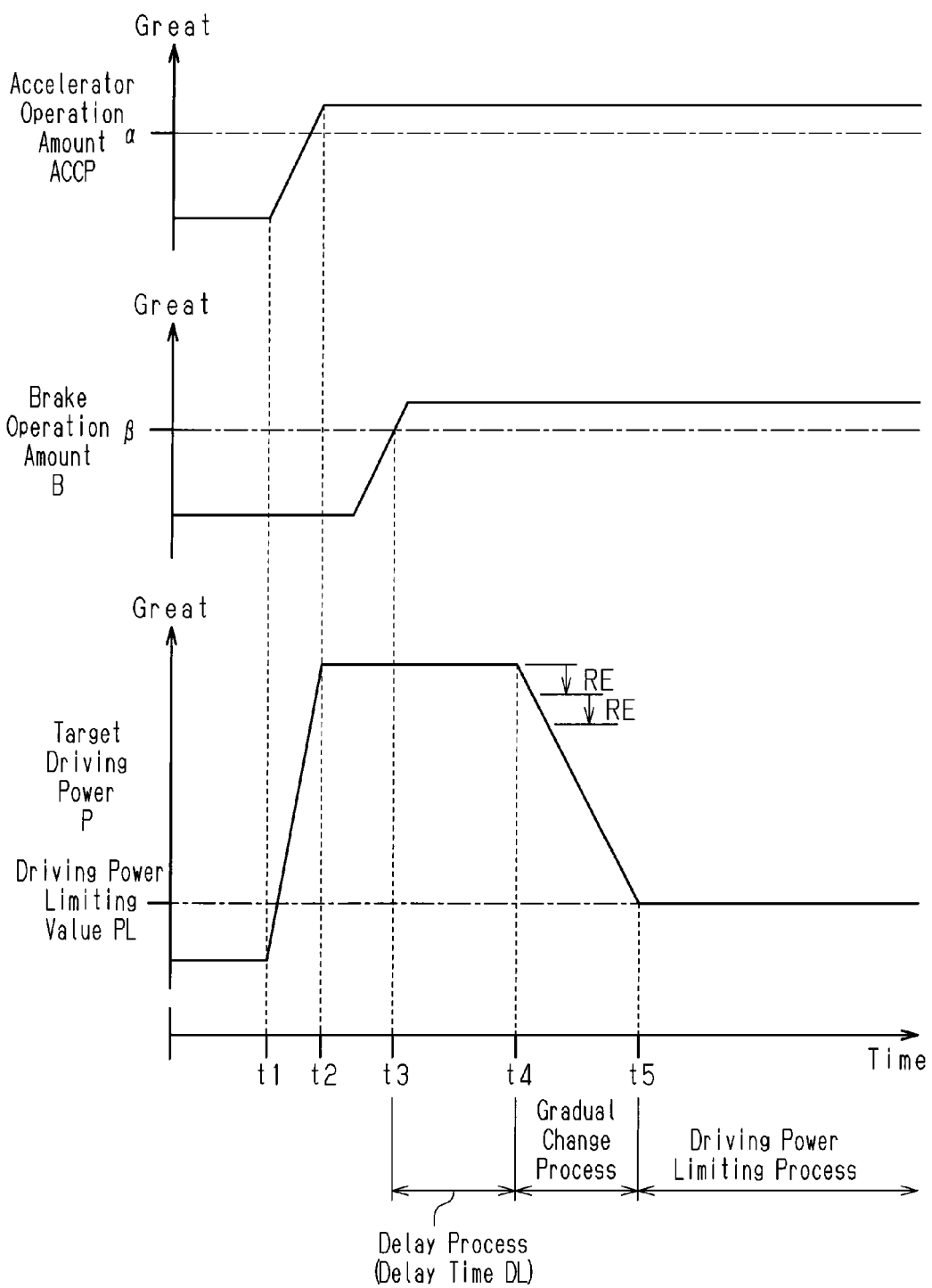
FIG. 2 is a timing diagram showing an overview of a brake override system according to the embodiment.

FIG. 2 shows an overview of the brake override system. As shown in FIG. 2, when the accelerator operation amount ACCP is greater than a predetermined accelerator determination value α and the brake operation amount B is greater than a predetermined brake determination value β (at or after a point in time t3), the electronic control unit 15 determines that the accelerator pedal 8 and the brake pedal 13 are being simultaneously operated.

If the driving power limiting process is executed immediately after it is determined that the accelerator pedal 8 and the brake pedal 13 are being simultaneously operated, drivability may be adversely affected.

For example, if simultaneous operation of the accelerator pedal 8 and the brake pedal 13 is accidental and not intended by the driver, immediate execution of the driving power limiting process results in deceleration of the vehicle despite the absence of driver's intention for deceleration, causing drivability to deteriorate. In this regard, when determining at the point in time t3 that the accelerator pedal 8 and the brake pedal 13 are being simultaneously operated, the electronic control unit 15 executes a delay process as a determination process for determining that the simultaneous operation of the accelerator pedal 8 and the brake pedal 13 is not accidental but intended by the driver.

At or after the point in time t3, in the delay process, a duration time KT is measured, during which the accelerator operation amount ACCP is greater than the accelerator determination value α and the brake operation amount B is greater than the brake determination value β, that is, the accelerator pedal 8 and the brake pedal 13 are operated simultaneously. When the measured duration time KT reaches a predetermined delay time DL (a point in time t4), the electronic control unit 15 determines that the simultaneous operation of the accelerator pedal 8 and the brake pedal 13 is not accidental but is intended by the driver and determines that an execution condition for the driving power limiting process is met. In contrast, if the measurement of the duration time KT is stopped before the delay time DL elapses, that is, if, during the delay process, the accelerator operation amount ACCP falls to or below the accelerator determination value α or if the brake operation amount B falls to or below the brake determination value β, the simultaneous operation of the accelerator pedal 8 and the brake pedal 13 is determined to be accidental. In this case, the execution condition for the driving power limiting process is determined to be not met.

The execution of the delay process, in which the above described determination is made, restrains an unintentional drop of the driving power when a simultaneous operation of the accelerator pedal 8 and the brake pedal 13 is accidental. This prevents drivability from deteriorating.

If the driving power limiting process is executed to significantly reduce the driving power immediately after simultaneous operation of the accelerator pedal 8 and the brake pedal 13 is performed, the vehicle deceleration is rapidly increased. This also adversely affects drivability. In this regard, the electronic control unit 15 executes a gradual change process for gradually reducing the driving power in a period from when the accelerator pedal 8 and the brake pedal 13 are simultaneously operated to when the driving power limiting process is started. In the gradual change process, if the execution condition for the driving power limiting process is determined to be met at the point in time t4, the driving power at the point in time t4, that is, the driving power before the start of the driving power limiting process, is gradually reduced toward a low driving power that will be achieved by the driving power limiting process. More specifically, a predetermined reduction amount RE is repeatedly subtracted from the target driving power P, which is set at the point in time t4, so that the vehicle driving power is gradually reduced. When the target driving power P reaches a driving power limiting value PL, which is determined in the driving power limiting process (a point in time t5), the gradual change process for the driving power is ended. In this manner, the gradual change process for gradually reducing the driving power is executed in a period from simultaneous operation of the accelerator pedal 8 and the brake pedal 13 to the start of the driving power limiting process, so that the driving power is prevented from being rapidly dropped and drivability is not caused to deteriorate by a rapid increase in the vehicle deceleration.

When the gradual change process is ended at the point in time t5, the driving power limiting process is executed for prioritizing the brake operation. In the driving power limiting process, the driving power limiting value PL is set to limit the driving power. The driving power limiting value PL is the upper limit value of the target driving power P. If the computed target driving power P is greater than the driving power limiting value PL, the driving power limiting value PL is set as the target driving power P. Therefore, during the execution of the driving power limiting process, the driving power of the vehicle is limited to be less than or equal to the driving power limiting value PL. The driving power limiting value PL is set to a value that allows the driving power of the vehicle to be sufficiently small in relation to the braking force of the brake device 12 at simultaneous operation of the accelerator pedal 8 and the brake pedal 13. This causes the brake operation to be prioritized even at simultaneous operation of the accelerator pedal 8 and the brake pedal 13.

If the determination process or the gradual change process is executed prior to the execution of the driving power limiting process, the time at which the driving power limiting process is executed is delayed compared to the case in which the driving power limiting process is executed immediately after simultaneous operation of the accelerator pedal 8 and the brake pedal 13 is performed. This extends the time required for the driving power to be sufficiently reduced at simultaneous operation of the accelerator pedal 8 and the brake pedal 13. Thus, when the accelerator pedal 8 and the brake pedal 13 are simultaneously operated, the braking distance of the vehicle tends to be longer than when normal brake operation is performed, that is, when only the brake pedal 13 is operated. Therefore, to stop the vehicle at a position predicted by the driver at simultaneous operation of the accelerator pedal 8 and the brake pedal 13, the driver must increase the amount of operation of the brake pedal 13 compared to the normal brake operation. This complicates the brake operation by the driver.

Figure 3:
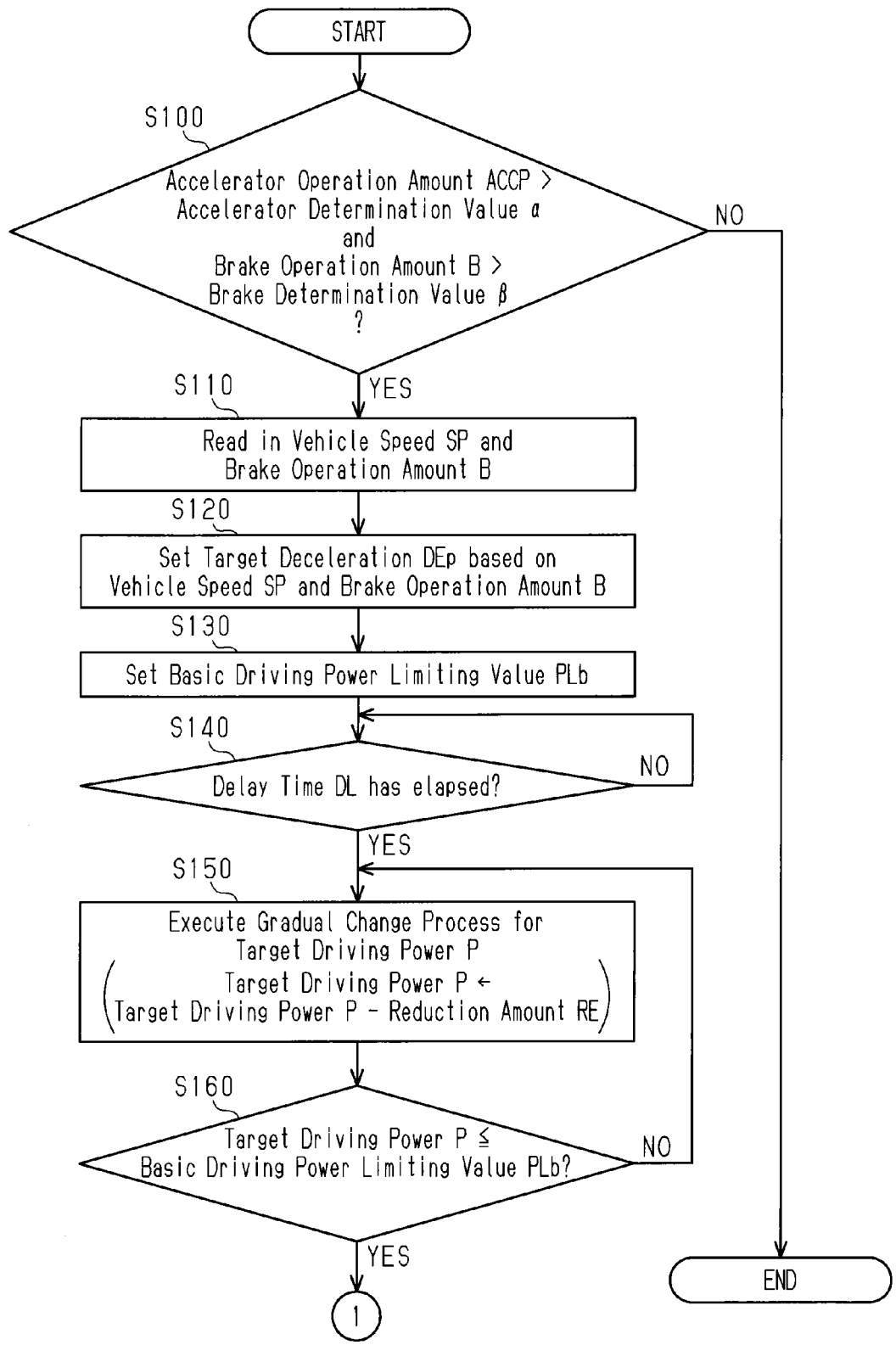
FIG. 3 is a flowchart showing a procedure of the brake override system according to the embodiment.
Figure 4:
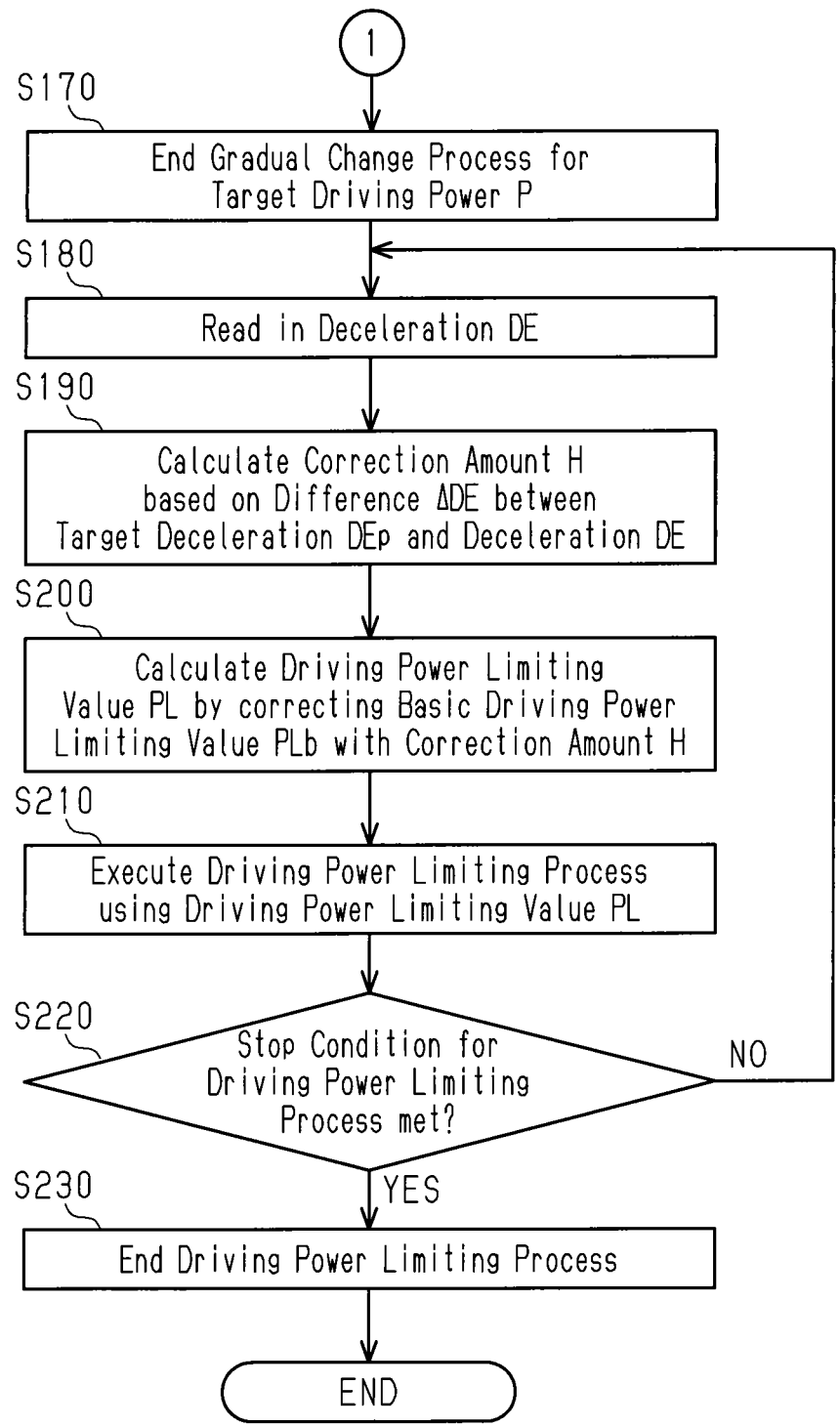
FIG. 4 is another flowchart showing the procedure of the brake override system according to the embodiment.

In this regard, in the present embodiment, when executing the driving power limiting process at simultaneous operation of the accelerator pedal 8 and the brake pedal 13, a procedure in the brake override system shown in FIGS. 3 and 4 is executed to facilitate the brake operation performed by the driver.

As shown in FIG. 3, the electronic control unit 15 first determines whether the accelerator operation amount ACCP is greater than the accelerator determination value $\alpha$ and the brake operation amount B is greater than the brake determination value $\beta$ (S100). If the outcome of step S100 is negative (S100: NO), the electronic control unit 15 temporarily suspends the process and executes step S100 in the next execution cycle.

If the outcome of step S100 is positive (S100:YES), the electronic control unit 15 reads in the vehicle speed SP and the brake operation amount B of a time prior to the start of the driving power limiting process (S110). In the present embodiment, the electronic control unit 15 reads in the vehicle speed SP and the brake operation amount B of a time at which the condition is met that the accelerator operation amount ACCP is greater than the accelerator determination value $\alpha$ and the brake operation amount B is greater than the brake determination value $\beta$.

Next, based on the vehicle speed SP and the brake operation amount B, which have been read in at step 110, the electronic control unit 15 sets a target deceleration DEp employed in the execution of the driving power limiting process (S120).

Figure 5:
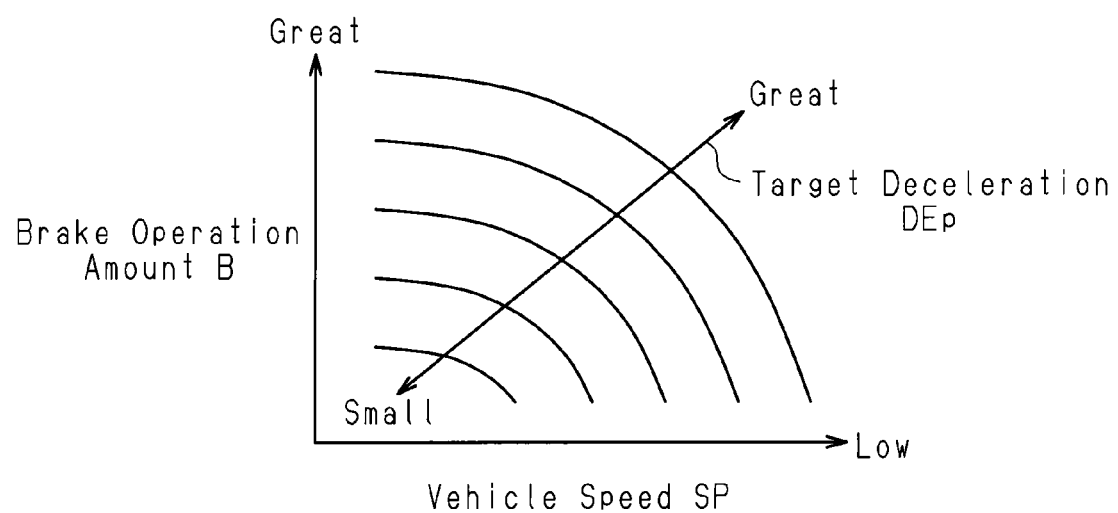
FIG. 5 is a conceptual diagram showing the relationship among the vehicle speed, the brake operation amount, and the target deceleration.

As shown in FIG. 5, the lower the vehicle speed SP is, the greater the target deceleration DEp is set to be. Also, the greater the brake operation amount B is, the greater the target deceleration DEp is set to be.

Next, the electronic control unit 15 reads in a basic driving power limiting value PLb, which is a basic value of the driving power limiting value PL (S130). The basic driving power limiting value PLb is a predetermined fixed value.

Then, the electronic control unit 15 determines whether the delay time DL has elapsed (S140). If the delay time DL has not elapsed, the electronic control unit 15 repeats step S140 until the delay time DL elapses. If the measurement of the duration time KT is stopped during repetitive execution of step S140, the electronic control unit 15 determines that the positive outcome of step S100 was caused by an accidental operation and that the execution condition for the driving power limiting process is not met.

In contrast, when the delay time DL has elapsed (S140: YES), the electronic control unit 15 determines that the execution condition for the driving power limiting process is met and executes the gradual change process for the target driving power P (S150). At step S150, the reduction amount RE is subtracted from the currently set target driving power P to renew the target driving power P.

Next, the electronic control unit 15 determines whether the target driving power P renewed at step S150 is less than or equal to the basic driving power limiting value PLb (S160). If the target driving power P is greater than the basic driving power limiting value PLb (S160: NO), the electronic control unit 15 repeatedly executes step S150, or the gradual change process of the target driving power P, until the target driving power P falls to or below the basic driving power limiting value PLb.

If the target driving power P is less than or equal to the basic driving power limiting value PLb (S160:YES), the electronic control unit 15 ends the gradual change process of the target driving power P (S170).

Next, the electronic control unit 15 reads in the current deceleration DE of the vehicle (S180). The vehicle deceleration DE may be acquired through any appropriate method. For example, the deceleration DE may be computed by subjecting the vehicle speed SP to time differentiation or detected by an acceleration sensor (not shown) provided in the vehicle.

Then, based on the difference $\Delta$DE between the target deceleration DEp and the deceleration DE, the electronic control unit 15 computes a correction amount H, with which the basic driving power limiting value PLb will be corrected (S190). At step S190, the deceleration DE is subtracted from the target deceleration DEp to calculate the difference $\Delta$DE. When the target deceleration DEp is greater than the deceleration DE, that is, when the actual deceleration DE is insufficient relative to the target deceleration so that the current driving power needs to be further reduced, the correction amount H is set in accordance with the difference $\Delta$DE such that the driving power limiting value PL is further reduced. In contrast, when the target deceleration DEp is less than the deceleration DE, that is, when the actual deceleration DE is greater than the target deceleration DEp so that the actual vehicle deceleration DE is excessively great, the current decrease amount of the driving power is excessively great. The decrease amount of the driving power thus needs to be reduced. In this case, the correction amount H is determined in accordance with the difference $\Delta$DE such that the driving power limiting value PL is increased.

Next, the electronic control unit 15 corrects the basic driving power limiting value PLb with the correction amount H to compute the driving power limiting value PL (S200) and executes the driving power limiting process (S210) by using the driving power limiting value PL.

Then, the electronic control unit 15 determines whether a stop condition for the driving power limiting process is met (S220). The stop condition is set as a case in which it is possible to determine whether the driving power limiting process no longer needs to be executed. For example, the stop condition may be a case in which the accelerator operation amount ACCP has become zero or a case in which the brake operation amount B has become 0.

When the stop condition for the driving power limiting process is not met (S220: NO), steps S180 to S220 are sequentially executed. Accordingly, the driving power during the execution of the driving power limiting process is controlled such that the deceleration DE becomes equal to the target deceleration DEp.

In contrast, when the stop condition for the driving power limiting process is met (S220: YES), the electronic control unit 15 ends the execution of the driving power limiting process, that is, terminates limitation on the target driving power P by the driving power limiting value PL (S230) and ends the current process.

Operation of the brake override system according to the present embodiment will now be described.

First, during execution of the driving power limiting process, the driving power is controlled such that the deceleration DE of the vehicle becomes equal to the target deceleration DEp. To set the target deceleration DEp, the brake operation amount B is taken into consideration as illustrated in FIG. 5. Thus, the driving power during the execution of the driving power limiting process can be controlled, factoring in the brake operation amount B by the vehicle driver.

When the normal brake operation, in which only the brake pedal 13 is operated, is executed, the lower the vehicle speed SP is, the shorter the braking distance becomes in general. Thus, the lower the vehicle speed SP is, the smaller the brake operation amount B by the driver becomes. Therefore, even when the driving power limiting process is executed, a lower vehicle speed SP possibly results in a smaller brake operation amount B by the driver. To maintain drivability, the driving power limiting process is executed after a predetermined time has elapsed from the point in time at which the accelerator pedal 8 and the brake pedal 13 are simultaneously operated. That is, the driving power limiting process is executed after the delay process and the gradual change process are executed. In such a case, the braking distance of the vehicle tends to be longer than that when the normal brake operation, in which only the brake operating member is operated, is executed. Particularly, in low vehicle speed regions, in which the brake operation amount B is small, the braking distance tends to be longer. Thus, the lower the vehicle speed SP is before the start of the driving power limiting process, the more frequently the brake operation amount B is increased and the greater the increase amount of the brake operation amount B becomes to stop the vehicle at a position predicted by the driver.

In this regard, the present embodiment takes into consideration not only the brake operation amount B, but also the vehicle speed SP when setting the target deceleration DEp. More specifically, the lower the vehicle speed SP is, the grater the target deceleration DEp is set to be. Therefore, the more likely it is that the brake operation amount B by the driver will become small due to a low vehicle speed SP, the greater the target deceleration DEp is set to be. Thus, the more likely it is that the brake operation amount B will become small, the greater the deceleration DE of the vehicle will become.

This allows the braking distance to be shortened by increasing the target deceleration DEp for a lower vehicle speed SP even in a low vehicle speed region. Thus, the vehicle can be stopped at a position predicted by the driver, while limiting the increase in the brake operation amount B by the driver. Therefore, it is possible to simplify the brake operation by the driver at the execution of the driving power limiting process when the accelerator pedal 8 and the brake pedal 13 are simultaneously operated.

The driver is aware that when the vehicle speed SP is high, the braking distance will be long compared to when the vehicle speed SP is low. Therefore, when the vehicle speed SP is high, the brake operation amount B is often greater from the beginning than when the vehicle speed SP is low. Also, the driver often operates the brake pedal 13 with the intention of increasing the brake operation amount B during deceleration of the vehicle. Therefore, when the vehicle speed SP is high, the driver is less likely to feel that the operation of the brake pedal 13 is complicated than when the vehicle speed SP is low. In this respect, the target deceleration DEp when the vehicle speed SP is high is set to be lower than that when the vehicle speed SP is low. Therefore, as the vehicle speed SP is increased, the influence of the vehicle speed SP is reduced at the setting of the target deceleration DEp, and the influence of the brake operation amount B is increased. Thus, the higher the vehicle speed SP is, the more easily the deceleration DE corresponding to the intention of the vehicle driver can be obtained, and the better drivability becomes.

As shown in FIG. 5, the greater the brake operation amount B is, the greater the target deceleration DEp is set to be. Therefore, the target deceleration DEp is set in accordance with the degree of the driver's demand for deceleration. This allows the actual deceleration DE of the vehicle to approach the degree of the driver's demand for deceleration.

As described above, the present embodiment has the following advantages.

(1) The driving power limiting process is executed when a predetermined time has elapsed after simultaneous operation of the accelerator pedal 8 and the brake pedal 13 is performed. The target deceleration DEp of the vehicle is set based on the vehicle speed SP and the brake operation amount B at a time before the driving power limiting process is started, and the driving power during execution of the driving power limiting process is controlled such that the vehicle deceleration DE becomes equal to the target deceleration DEp. This allows the braking distance to be shortened by increasing the target deceleration DEp for a lower vehicle speed SP. Thus, the vehicle can be stopped at the position predicted by the driver, while limiting increase in the brake operation amount B by the driver. Therefore, it is possible to simplify the brake operation by the driver at the execution of the driving power limiting process when the accelerator pedal 8 and the brake pedal 13 are simultaneously operated.

(2) The lower the vehicle speed SP is, the greater the target deceleration DEp is set to be. Thus, the more likely it is that the brake operation amount B will become small, the greater the vehicle deceleration DE that can be set.

(3) The greater the brake operation amount B is, the greater the target deceleration DEp is set to be. This allows the actual deceleration DE of the vehicle to approach the degree of the driver's demand for deceleration.

(4) The delay process is executed to determine whether simultaneous operation of the accelerator pedal 8 and the brake pedal 13 has continued for a predetermined time. The driving power limiting process is executed when it is determined that the simultaneous operation of the accelerator pedal 8 and the brake pedal 13 has continued for the predetermined time. In this manner, the driving power limiting process is executed when it is determined that the simultaneous operation of the accelerator pedal 8 and the brake pedal 13 has continued. This restrains an unintentional drop of the driving power when the simultaneous operation of the accelerator pedal 8 and the brake pedal 13 is executed accidentally.

(5) The gradual change process is executed for gradually reducing the driving power in a period from when simultaneous operation of the accelerator pedal 8 and the brake pedal 13 is started to when the driving power limiting process is started. Thus, the driving power is restrained from being rapidly dropped due to execution of the driving power limiting process. This limits a rapid increase of the vehicle deceleration that accompanies the execution of the driving power limiting process. Drivability therefore will not deteriorate due to a rapid increase in the vehicle deceleration.

The above described embodiment may be modified as follows.

Figure 6:
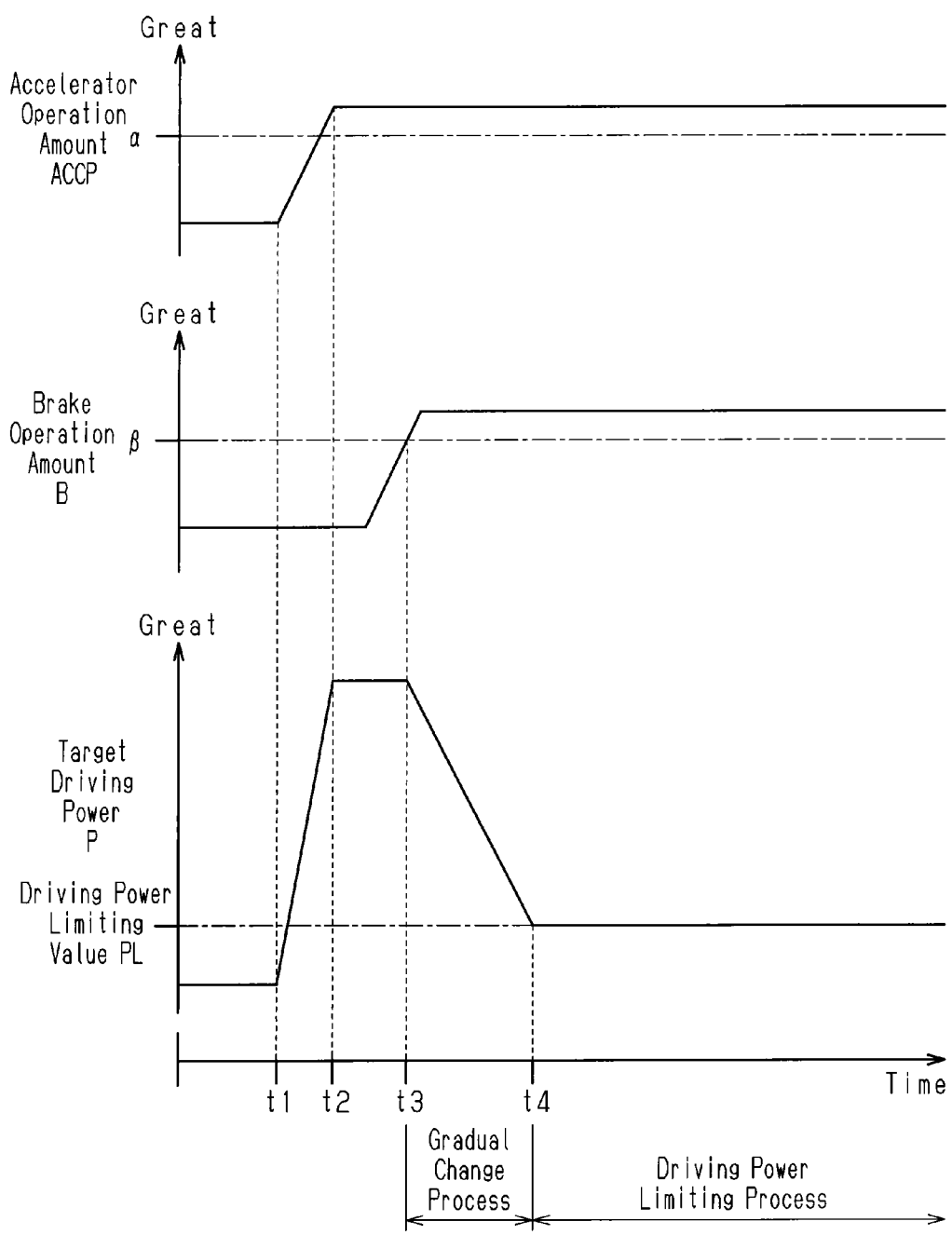
FIG. 6 is a timing diagram showing an overview of a brake override system according to a modification of the embodiment.

When the accelerator operation amount ACCP is greater than the accelerator determination value α, and the brake operation amount B is greater than the brake determination value β (at a point in time t3 in FIG. 6), the delay process may be omitted and the gradual change process may be executed immediately. In this case, the advantages except for the advantage (4) are obtained.

Figure 7:
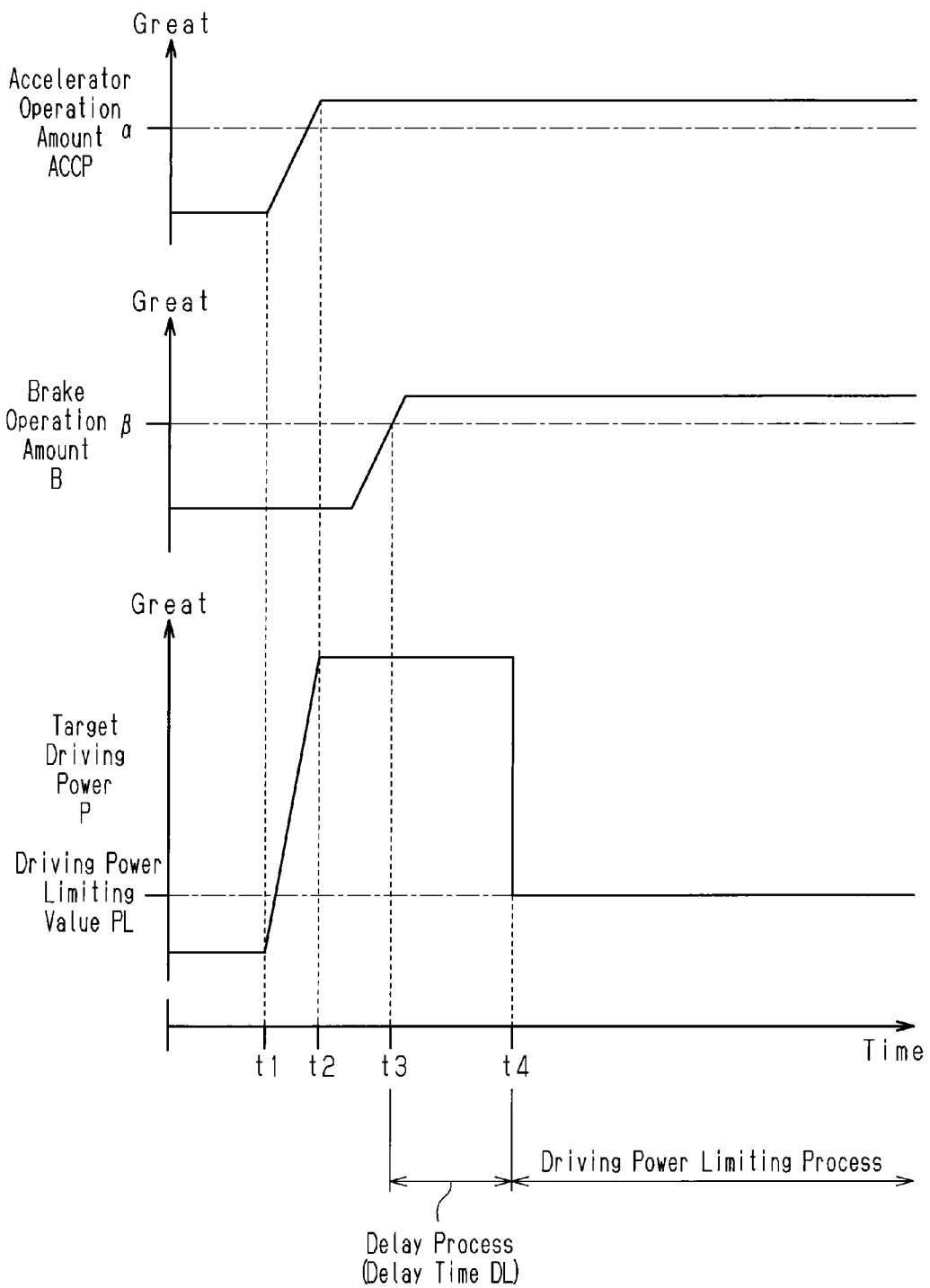
FIG. 7 is a timing diagram showing an overview of a brake override system according to a modification of the embodiment.

When the accelerator operation amount ACCP is greater than the accelerator determination value α, and the brake operation amount B is greater than the brake determination value β (at a point in time t3 in FIG. 7), the delay process may be executed. At the point in time when the delay process is ended (a point in time t4 in FIG. 7), the driving power limiting process may be executed. That is, the gradual change process may be omitted. In this case, the advantages except for the advantage (5) are obtained.

In the above illustrated embodiment, the target driving power P is controlled not to exceed the driving power limiting value PL at the execution of the driving power limiting process. However, the driving power may be restricted in a different manner. For example, during the execution of the driving power limiting process, the target driving power P may always be reduced.

The vehicle speed SP and the brake operation amount B for setting the target driving power P are values at the time when conditions are met that the accelerator operation amount ACCP is greater than the accelerator determination value α and the brake operation amount B is greater than brake determination value β. However, the time at which the vehicle speed SP and the brake operation amount B are obtained is not limited to that time. Specifically, the vehicle speed SP and the brake operation amount B may be obtained in a period from when the accelerator pedal 8 and the brake pedal 13 are simultaneously operated to when the driving power limiting process is started.

The vehicle in the above illustrated embodiment is a hybrid vehicle, which includes an engine and a motor as drive sources. A system similar to the above described brake override system may be mounted on a vehicle that includes only a motor as a drive source. In this case, the above described target driving power P may be used as a demanded driving power for the motor.

A system similar to the above described brake override system may be mounted on a vehicle that includes only an engine as a drive source. In such a vehicle, the driving power is adjusted by regulating the opening degree of the throttle valve 21 in accordance with the accelerator operation amount ACCP. Thus, the driving power limiting process for limiting the driving power can be executed by restricting the opening degree of the throttle valve 21.

For example, the actual accelerator operation amount ACCP is compared with a demanded accelerator operation amount that has been computed through various engine control processes, and the greater one or the smaller one is set as a control accelerator operation amount ACCPCN. When setting a target opening degree of the throttle valve 21 in accordance with the control accelerator operation amount ACCPCN, the control accelerator operation amount ACCPCN is used as a value that corresponds to the target driving power P, as illustrated in FIG. 8. Also, an accelerator limiting value AL is employed as a value that corresponds to the driving power limiting value PL and limits the maximum value of the control accelerator operation amount ACCPCN. The accelerator limiting value AL may be corrected based on the difference ΔDE between the target deceleration DEp and the deceleration DE. In this case also, the advantages equivalent to those described above are obtained.

In a case in which the accelerator operation amount ACCP is reflected, without being changed, on the target throttle opening degree TAp, which is a target opening degree of the throttle valve 21, the target throttle opening degree TAp is used as a value corresponding to the target driving power P, as illustrated in FIG. 9. Also, a throttle limiting value TAL is employed as a value that corresponds to the driving power limiting value PL and limits the maximum value of the target throttle opening degree TAp. The throttle limiting value TAL may be corrected based on the difference ΔDE between the target deceleration DEp and the deceleration DE. In this case also, the advantages equivalent to those described above are obtained.

In the above illustrated embodiment, the accelerator operation is executed through depression of the accelerator pedal 8. However, the accelerator operation may be executed through operation other than pedal depression. Accelerator operating members other than the accelerator pedal 8 include a member operated by a hand such as a lever-type operating member provided in the vicinity of the steering wheel or the instrument panel. Likewise, the brake operation is executed through depression of the brake pedal 13 in the above illustrated embodiment. However, the brake operation may be executed through operation other than pedal depression. Brake operating members other than the brake pedal 13 include a member operated by a hand such as a lever-type operating member provided in the vicinity of the steering wheel or the instrument panel.

DESCRIPTION OF THE REFERENCE NUMERALS

1 . . . Engine, 2 . . . Power Split Device, 3 . . . Drive Shaft, 4 . . . First Motor-Generator, 5 . . . Second Motor-Generator, 6 . . . Battery, 7 . . . Inverter, 8 . . . Accelerator Pedal, 9 . . . Accelerator Position Sensor, 10 . . . Vehicle Speed Sensor, 11 . . . Wheels, 12 . . . Brake Device, 13 . . . Brake Pedal, 14 . . . Brake Sensor, 15 . . . Electronic Control Unit, 20 . . . Intake Passage, 21 . . . Throttle Valve

The invention claimed is:

1. A vehicle control device comprising a controller, wherein
the controller executes a driving power limiting process, in which the controller reduces a driving power output by a drive source when an accelerator operating member and a brake operating member are being operated together in comparison to when only the accelerator operating member is operated, the controller is configured to execute the driving power limiting process when a predetermined time has elapsed after a point in time at which the accelerator operating member and the brake operating member are simultaneously operated, the controller is configured, when the accelerator operating member and the brake operating member are simultaneously operated, to set a target deceleration of the vehicle based on a vehicle speed and an operation amount of the brake operating member at a time before the driving power limiting process is started, and to control the driving power during execution of the driving power limiting process such that the vehicle deceleration becomes equal to the target deceleration, the lower the vehicle speed is, the greater the target deceleration is set to be, and the greater the operation amount of the brake operating member is, the greater the target deceleration is set to be.

2. The vehicle control device according to claim 1, wherein the controller is configured to execute the driving power limiting process when simultaneous operation of the accelerator operating member and the brake operating member has been continuing.

3. The vehicle control device according to claim 1, wherein the controller is configured to execute a gradual change process for gradually reducing the driving power in a period from when the accelerator operating member and the brake operating member are simultaneously operated to when the driving power limiting process is started.

4. A vehicle control device comprising a controller, wherein the controller executes a driving power limiting process, in which the controller reduces a driving power output by a drive source when an accelerator operating member and a brake operating member are being operated together in comparison to when only the accelerator operating member is operated, the controller is configured to execute the driving power limiting process when a predetermined time has elapsed after a point in time at which the accelerator operating member and the brake operating member are simultaneously operated, the controller is configured, when the accelerator operating member and the brake operating member are simultaneously operated, to set a target deceleration of the vehicle based on a vehicle speed and an operation amount of the brake operating member at a time before the driving power limiting process is started, and to control the driving power during execution of the driving power limiting process such that the vehicle deceleration becomes equal to the target deceleration, and the lower the vehicle speed is, the greater the target deceleration is set to be.

5. The vehicle control device according to claim 4, wherein the controller is configured to execute the driving power limiting process when simultaneous operation of the accelerator operating member and the brake operating member has been continuing.

6. The vehicle control device according to claim 4, wherein the controller is configured to execute a gradual change process for gradually reducing the driving power in a period from when the accelerator operating member and the brake operating member are simultaneously operated to when the driving power limiting process is started.

* * * * *